(12) United States Patent
Nilsson

(10) Patent No.: US 8,430,145 B2
(45) Date of Patent: Apr. 30, 2013

(54) HOT GAS NOZZLE FOR HEATING A DOUBLE-TUBE, A TUBE FILLING MACHINE COMPRISING A HOT GAS NOZZLE AND A METHOD FOR SEALING A DOUBLE TUBE

(75) Inventor: Jan Nilsson, Kalmar (SE)

(73) Assignee: Norden Machinery AB (SE)

( * ) Notice: Subject to any disclaimer, the term of this patent is extended or adjusted under 35 U.S.C. 154(b) by 122 days.

(21) Appl. No.: 12/867,813

(22) PCT Filed: Feb. 17, 2009

(86) PCT No.: PCT/SE2009/050167
§ 371 (c)(1),
(2), (4) Date: Dec. 6, 2010

(87) PCT Pub. No.: WO2009/105016
PCT Pub. Date: Aug. 27, 2009

(65) Prior Publication Data
US 2011/0204100 A1    Aug. 25, 2011

(30) Foreign Application Priority Data

Feb. 22, 2008  (SE) ...................................... 0800406

(51) Int. Cl.
*B29C 65/10*        (2006.01)
(52) U.S. Cl.
USPC ............................. 156/497; 156/498; 53/477
(58) Field of Classification Search .......... 156/497–499; 432/224, 225; 493/134; 53/477, 479, 373.9
See application file for complete search history.

(56) References Cited

U.S. PATENT DOCUMENTS

| 5,255,494 A * | 10/1993 | Doyle .............................. 53/477 |
| 5,868,567 A | 2/1999 | Abe et al. |
| 6,574,946 B1 * | 6/2003 | Linner ............................ 53/479 |
| 7,021,032 B2 * | 4/2006 | Linner ............................ 53/479 |
| 2003/0175648 A1 | 9/2003 | Kanematsu et al. |

FOREIGN PATENT DOCUMENTS

| JP | 08-301207 A | 11/1996 |
| WO | WO-94/19251 A1 | 9/1994 |
| WO | WO-99/29572 A1 | 6/1999 |

OTHER PUBLICATIONS

"International Application Serial No. PCT/SE2009/050167, International Search Report mailed Jun. 9, 2009", 5 pgs.

* cited by examiner

*Primary Examiner* — Katarzyna Wryrozebski Lee
*Assistant Examiner* — Scott W Dodds
(74) *Attorney, Agent, or Firm* — Schwegman Lundberg & Woessner, P.A.

(57) ABSTRACT

The invention relates to a hot gas nozzle adapted for heating an end section of a double tube, where the double tube comprises a first tube and a second tube, comprising a first and a second inner nozzle insert having outlet openings adapted to heat an internally located section in a double tube with hot air, where the hot gas nozzle further comprises a first and a second outer nozzle insert having outlet openings adapted to heat an externally and between the tubes located section of the double tube with hot air, which section after a sealing of the double tube will join the tubes. The invention further relates to a tube filling machine comprising a hot gas nozzle and a method for sealing and joining a double tube. The object of the invention is to obtain an improved sealing of double tubes.

14 Claims, 4 Drawing Sheets

HOT GAS NOZZLE FOR HEATING A DOUBLE-TUBE, A TUBE FILLING MACHINE COMPRISING A HOT GAS NOZZLE AND A METHOD FOR SEALING A DOUBLE TUBE

RELATED APPLICATIONS

This application is a U.S. National Stage Filing under 35 U.S.C. 371 from International Patent Application Serial No. PCT/SE2009/050167, filed Feb. 17, 2009, and published on Aug. 27, 2009 as WO 2009/105016 A1, which claims the priority benefit of Sweden Application Serial No. 0800406-1, filed Feb. 22, 2008, the contents of which are incorporated herein by reference in their entirety.

TECHNICAL FIELD

Embodiments of invention relate to one or more of a hot gas nozzle for a double tube, a tube filling machine, and a method for sealing and joining together a double tube. Embodiments of the invention relate to double tubes comprising two tubes arranged next to each other and having a common shoulder section.

BACKGROUND ART

Double tubes, e.g. different types of two chamber or multi chamber tubes, are used to pack different types of products or components that for some reason should not be mixed in the package. This may e.g. apply to products that will react chemically or in another way by mutual contact. It is desirable for this type of products that such a reaction starts when the content, partially or completely, is emptied from the tube. The product often requires that it is mixed in order to obtain a homogenous composition, if a specific mixing nozzle is not used. The components must thus be stored separately in the tube under such conditions.

Double tubes can also be used for products that does not react chemically but that nevertheless should be stored separately form each other, e.g. for aesthetic reasons. One such example is the forming of the components in a predefined pattern when they are squeezed out of the tube such that the product is given a specific appearance. Examples of this are striped toothpaste and striped fish roe spread.

A double tube can either consist of a single tube with an inner partition wall or two tubes joined at a shoulder section.

It is important that that the sealing of a double tube is quick and reliable and that it gives an adequate air tightness and an appropriate appearance. Since the sealing of a tube is done in the same production flow as the filling of the tube, the filling, the heating and the sealing must be performed in the same working stroke in order not to create an unbalance in the system. It is thus important that the heating can be performed at least as fast as any of the other operations, such that the heating does not become the limiting factor for the speed of the system.

The joining of a tube is often done by using heated clamping jaws. The heating and joining are in these situations done in the same operational step by heating and thereby melting the tube material together under pressure. The heating of the tube material by hot air is also known. It is e.g. known from WO94/19251 to heat the material for double tubes arranged next to each other with hot air. The double tube is sealed in a subsequent operational step. Even if the shown method for sealing double tubes may give an acceptable result in some cases, there is still room for improvements and developments.

DISCLOSURE OF INVENTION

An object of the invention is therefore to provide an improved hot gas nozzle for a double tube and an improved method for to seal and join a double tube.

One or more solutions to this problem according to various embodiments of the invention is described herein with regards to embodiments of the hot gas nozzle, embodiments regarding a tube filling machine, and in various embodiments regarding the various methods to seal and join a double tube.

With a hot gas nozzle adapted for heating an end section of a double tube, where the double tube comprises a first tube and a second tube, where the hot gas nozzle comprises a first inner nozzle insert and a second inner nozzle insert, where the inner nozzle inserts comprises a plurality of outlet openings adapted to heat an internally located section of the double tube with hot air, the object of the invention is achieved in that the hot gas nozzle further comprises a first outer nozzle insert and a second outer nozzle insert, where the outer nozzle inserts comprise a plurality of outlet openings adapted to heat an externally and between the tubes located section of the double tube, which section after a sealing of the double tube will join the tubes.

By this first embodiment of the hot gas nozzle according to the invention, the hot gas nozzle is provided with two inner nozzle inserts for to heat the inside of the tubes of the double tube, and two outer nozzle inserts for to heat the external section between the tubes of the double tube. The inventive hot gas nozzle will thus ensure a reliable sealing of the two tubes, together with a reliable joining of the two tubes.

In an advantageous first development of the hot gas nozzle according to the invention, the first and the second inner nozzle inserts comprises a projecting edge adapted to direct the air flow from the outlet openings. The advantage of this is that the hot air can be directed away from sections that should not be heated, and which are thus protected from unnecessary heating.

In an advantageous further development of the hot gas nozzle according to the invention, the first and the second inner nozzle inserts as well as the first and the second outer nozzle inserts are detachably attached to the hot air nozzle. The advantage of this is that the nozzle inserts can be removed for cleaning, replacement or adjustments. It is also possible to change to nozzle inserts with different dimensions. In this way, the hot gas nozzle can be modified without the need to replace the complete hot gas nozzle.

In an advantageous further development of the hot gas nozzle according to the invention, the first and the second inner nozzle insert each comprises a guiding end. The advantage of this is that the tubes of the double tube can be guided onto the hot gas nozzle, which will give a more reliable heating of the tubes and thus a more reliable joining of the double tube.

In an advantageous further development of the hot gas nozzle according to the invention, the total area of the outlet openings of the first inner nozzle insert differs from the total area of the outlet openings of the second inner nozzle insert. The advantage of this is that different amounts of hot air can be directed to respective tubes, which means that each tube can be heated individually in an optimal way. This allows tubes made of different tube materials to be sealed and joined in a reliable way.

In an advantageous further development of the hot gas nozzle according to the invention, at least one of the first or the second inner nozzle inserts or the first or second outer nozzle inserts is supplied with hot air from a separate hot air conduit. The advantage of this is that the different nozzle inserts can be supplied with hot air in an individual way, which means that the air flow to each nozzle insert can be adapted as required. The air flow can thus be adapted to different tube materials without replacing the hot air nozzle.

In an advantageous further development of the hot gas nozzle according to the invention, the hot gas nozzle further comprises a cooling ring adapted to cooperate with the hot gas nozzle. The advantage of this is that the sections of the double tube that should not be heated can be protected from heating in a secure way.

In an advantageous further development of the hot gas nozzle according to the invention, the cooling ring comprises two openings in which the first and the second inner nozzle inserts fits. The advantage of this is that the protection of the sections that should not be heated is improved.

In an advantageous further development of the hot gas nozzle according to the invention, the openings are provided with guiding surfaces. The advantage of this is that the guiding of the double tube in the hot gas nozzle is improved.

In an advantageous tube filling machine according to the invention, the tube filling machine comprises an inventive hot gas nozzle.

With the inventive method for sealing and joining together a double tube comprising a first tube and a second tube arranged next to each other, the steps of heating an internal section of the first tube and the second tube with inner nozzle inserts, heating an external section of the first tube and the second tube with outer nozzle inserts, where the heated section is located between the first and the second tube such that the heated external section after the double tube is sealed will join the tubes, and sealing and joining the end seal section of the double tube with clamping jaws are comprised. This method ensures that both tubes are sealed in a reliable way, together with a reliable joining of the two tubes.

In an advantageous further development of the method according to the invention, the internal sections and the external sections of the double tube are heated simultaneously. The advantage of this is that the heating is faster and that the repeatability of the heating is improved since one of the sections is not cooled down.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
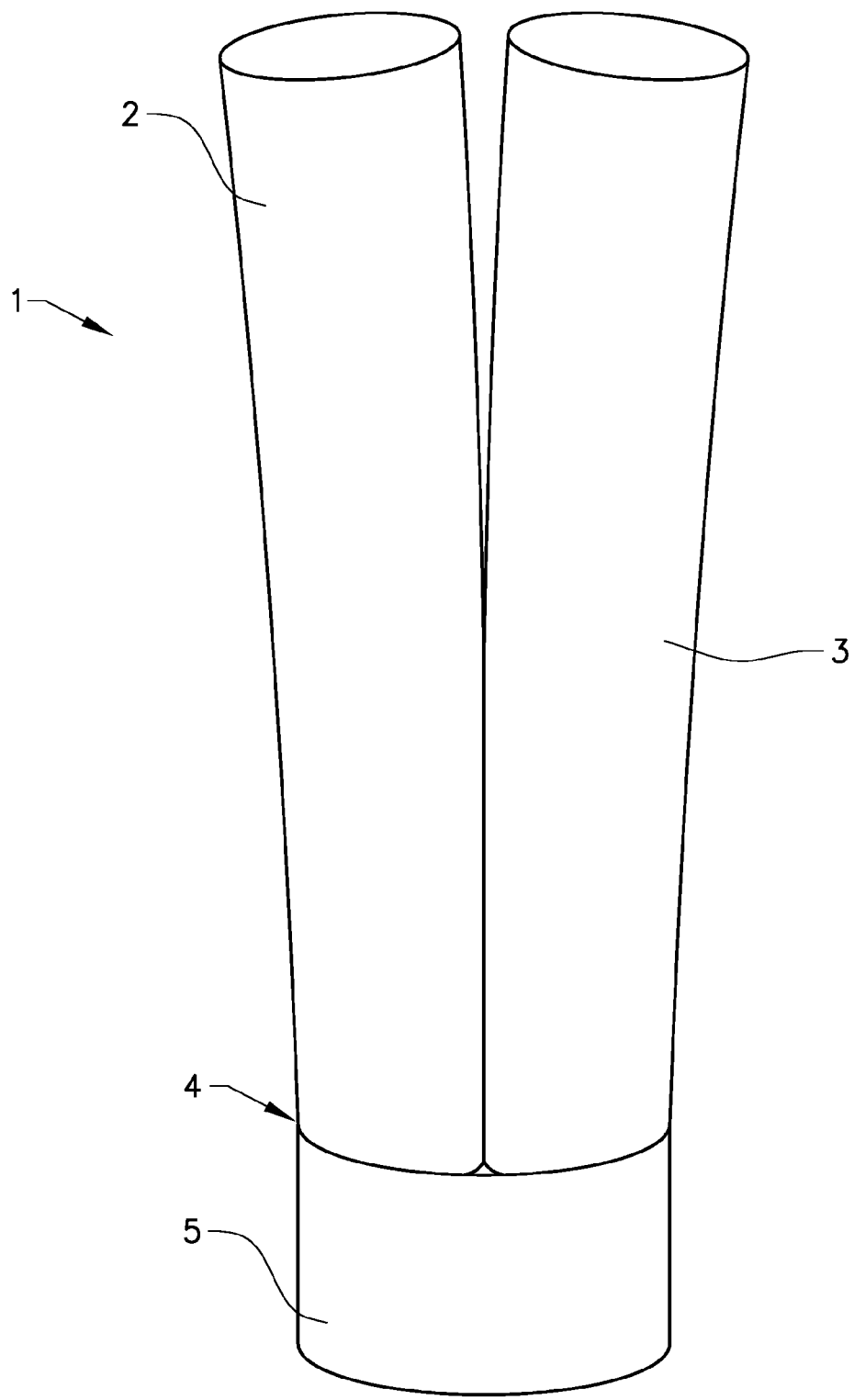
FIG. 1 shows a double tube that is not sealed.

FIG. 1 shows a double tube 1 comprising a first tube 2 and a second tube 3 which join in a tube shoulder 4. The tube shoulder comprises outlet passages (not shown) for separate outflow and consecutive mixing of the content in the first tube 2 and the second tube 3. The outlet passages may either be separated from each other so that the outflow of the content in each tube is completely separated. This is of advantage when the tubes comprise substances that react chemically with each other. The outlet passages may also be combined such that the content of the tubes are mixed at the outflow. The outlet passages may e.g. form a pattern of the content in the tubes. The tube shoulder 4 is provided with a cap 5. The cap may either be a press on cap or a screw cap, when the outlet passages are combined such that a circular outlet section is formed.

In the shown embodiment, the first tube and the second tube are provided with circular cross-sections in the section apart from the tube shoulder, which is preferred for the sealing that will be described later, even if a somewhat oval cross-section is also possible. This will partly depend on the chosen manufacturing method for the tubes.

The choice of material for the double tube, i.e. for the first tube and the second tube, depends on the intended application. Normally, a thermoplastic of the polyolefin type, e.g. polythene, polypropylene etc, with or without a barrier layer, will be used. In order to be able to apply the hot air activating technique and the heat sealing technique that will be described, it is important that the open end sections of the double tube in FIG. 1 comprises a material that is heat sealable.

Figure 2:
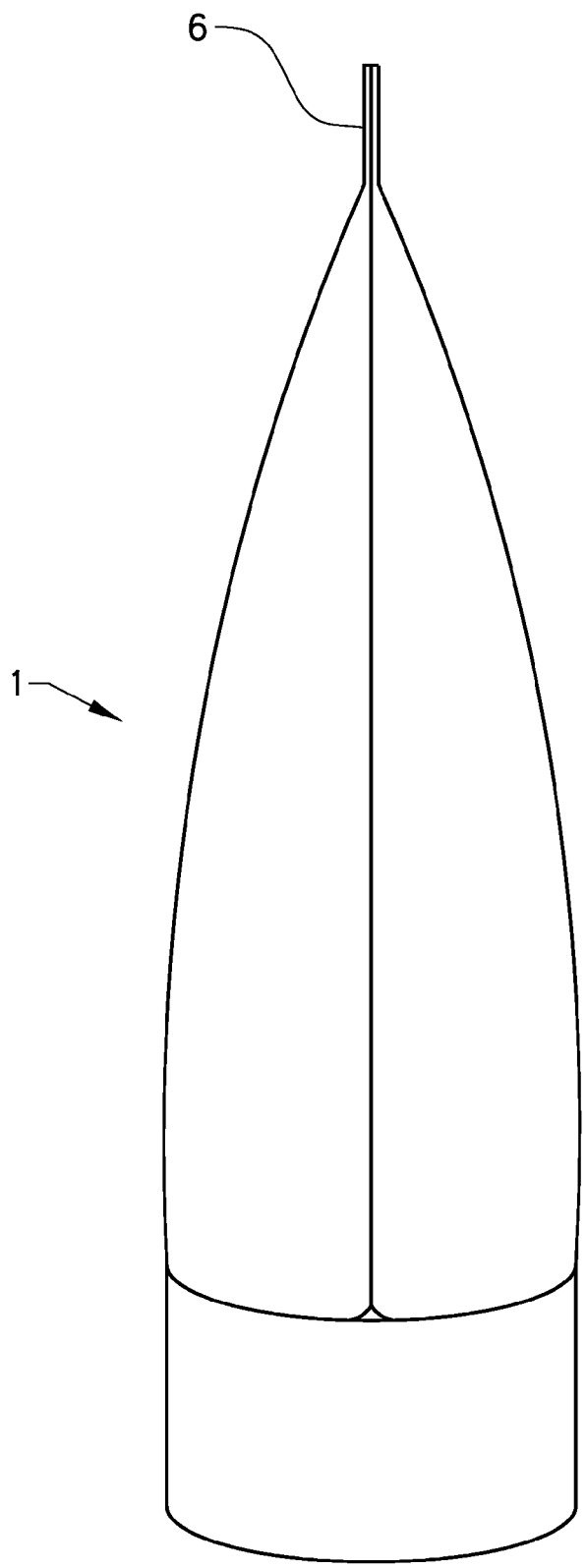
FIG. 2 shows a double tube that is sealed.

The double tube 1 is inserted in the tube filling machine directly from transport packages filled with a great number of double tubes which are supplied by a tube manufacturer. It is an important object to obtain a hermetic and aesthetic end seal of the double tube, both when the first tube and the second tube consist of the same or of different materials. Such an end seal is shown in FIG. 2, where an end seal section 6 is shown. For this reason, the invention provides a specific heat activating process.

In a working place in a tube filling machine according to the invention, the open end sections of the double tube 1 are heated and thereafter in a consecutive working place are heat sealed with clamping jaws, preferably cooled jaws. It is in connection with this important that each tube is not only sealed in a satisfactory way, but that the two tubes are also joined in the same sealing process in a satisfactory way. In order to obtain such a seal, it is important that all the surfaces that are to be sealed are heat treated in a similar way. This means that the insides of the end sections of the tubes will be heat treated. In addition, the outer surfaces of the end sections of the tubes that are directed to each other, i.e. the outer sections that will bear on each other after the sealing, will also be heat treated. This will ensure a good attachment both of the end section of each tube and of both the end sections of the tubes, which will ensure a hermetic and aesthetic end seal.

Figure 3:
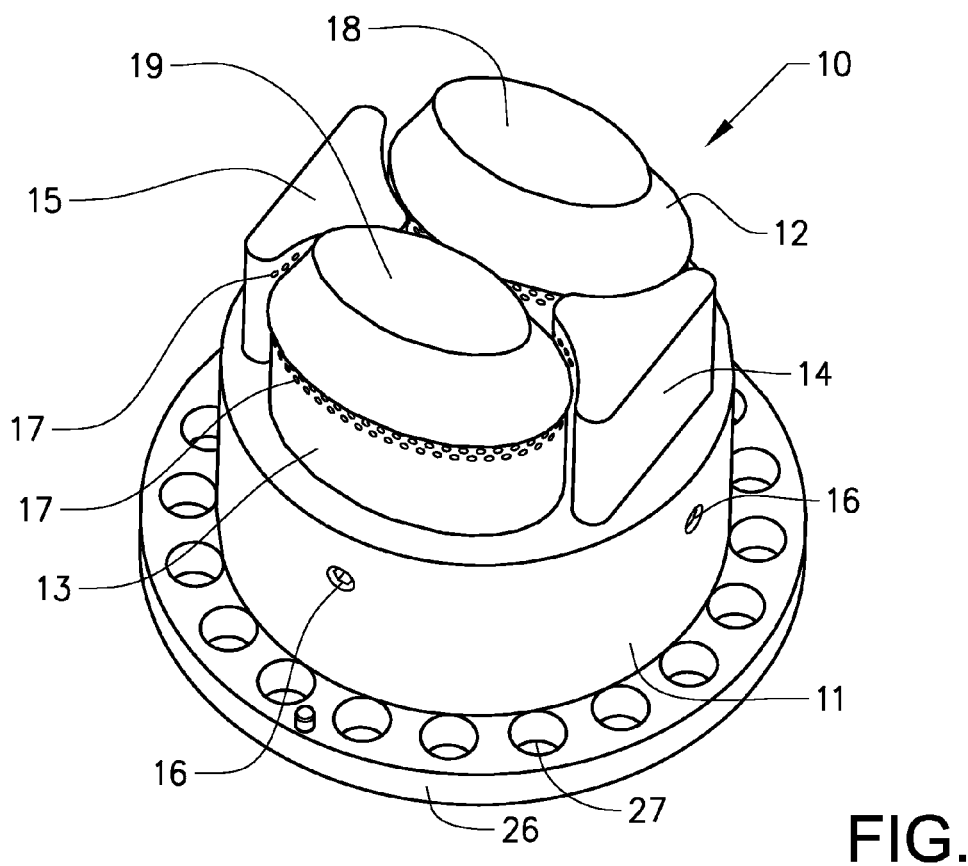
FIG. 3 shows a hot gas nozzle according to the invention.
Figure 4:
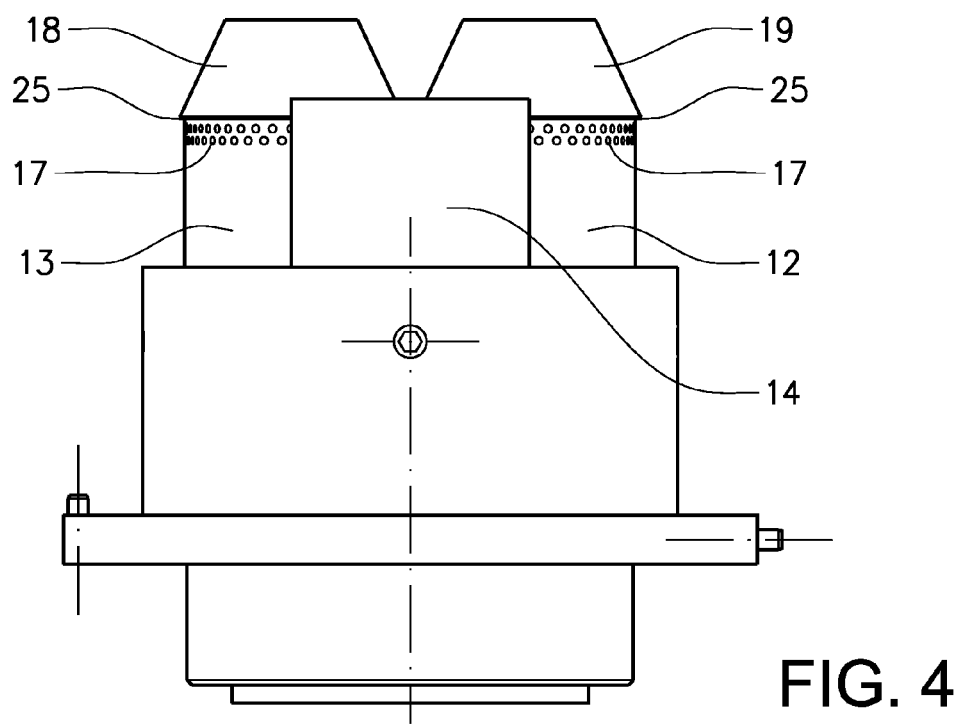
FIG. 4 shows a side view of the hot gas nozzle according to the invention.
Figure 5:
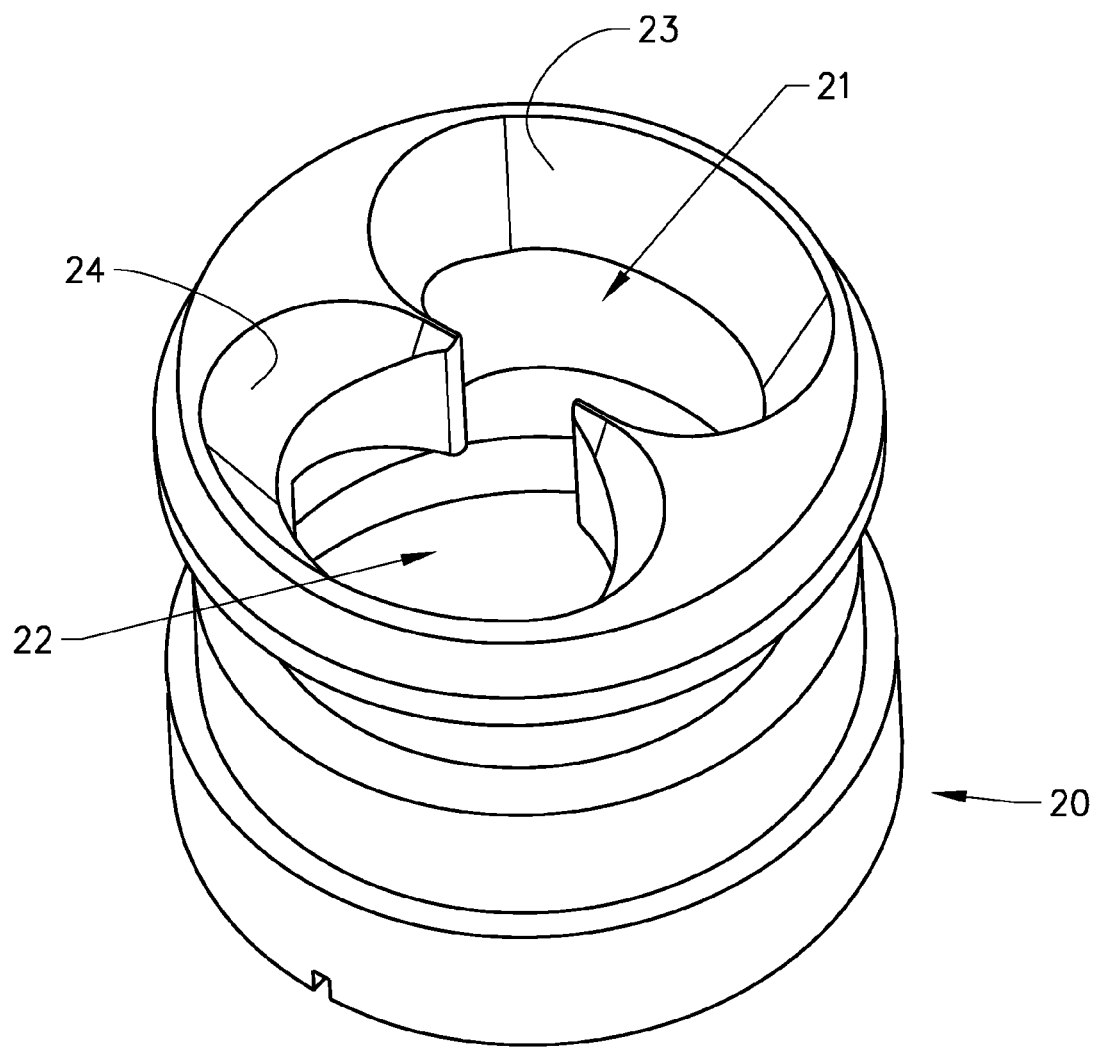
FIG. 5 shows a cooling ring adapted to be used with the hot gas nozzle according to the invention.

A hot gas nozzle 10, preferably a hot air nozzle, according to a preferred embodiment of the invention is shown in FIG. 3. The hot air nozzle 10 comprises a nozzle body 11 in which nozzle inserts are attached. The nozzle body is preferably circular even if other shapes are also conceivable. In the shown example, the nozzle body 11 comprises a first inner nozzle insert 12, a second inner nozzle insert 13, a first outer nozzle insert 14 and a second outer nozzle insert 15. The first inner nozzle insert 12 is provided with a guiding end 18 and the second inner nozzle insert 13 is provided with a guiding end 19.

The nozzle inserts are in the shown example removable attached in the nozzle body, e.g. with stop screws 16. The use of stop screws will allow a nozzle insert to be removed from the nozzle body in an easy way, e.g. for cleaning, adjustment or replacement. It is also possible to attached one or more nozzle insert permanently, e.g. by soldering. In one example, it may be of advantage that the inner nozzle inserts are removable for cleaning, since they, e.g. by an improper filling of the tubes, may come into contact with the product in a tube. The cleaning of the inner nozzle inserts is thereby greatly simplified.

The hot air nozzle further comprises a circular flange 26, which is provided with outflow openings 27 adapted to discard the used hot air. The outlet openings are preferably connected to an outlet channel for hot air in the tube filling machine.

The nozzle inserts are provided with outlet openings 17 adapted to direct hot air from a hot air source in the tube filling machine towards a specific section of the tubes. The outlet openings in the inner nozzle inserts 12, 13 are positioned around the upper edge of the straight section of the inserts, adjoining the guiding ends. The outlet openings in the outer nozzle inserts 14, 15 are positioned in the upper edge of the inserts, in the concave surfaces that are directed towards the inner nozzle inserts. A projecting edge 25 is arranged between the outlet openings 17 and the guide ends 18, 19. The purpose of this edge is to direct the hot air flow from the outlet openings in the direction towards the outflow openings 27 of the hot gas nozzle, such that as little hot air as possible may enter the very tubes. This counteracts an unnecessary heating of the tubes. The dimensions of the edges are such that the tube can easily be slid over the edge.

When a double tube is to be sealed and joined, the filled double tube is conveyed towards the hot air nozzle in the tube filling machine. Since the double tube is aligned in the tube filling machine, the first tube 2 will be conveyed into the first inner nozzle insert 12 with the help of the guiding end 18 and simultaneously, the second tube 3 will be conveyed into the second inner nozzle insert 13 with the help of the guiding end 19. The double tube is stopped at a height such that the end sections of the tubes align with the outlet openings in the hot air nozzle.

When the double tube is positioned in the hot air nozzle, hot air is conducted through the outlet openings. In a first embodiment, all nozzle inserts are connected to the same hot air source. In this example, the nozzle body has one single opening that connects to the hot air source. The hot air may be activated constantly, such that the nozzle blows hot air continuously, or the hot air may be activated when the hot air nozzle is correctly positioned.

At the same time that the outlet openings of the inner nozzle inserts directs hot air on the inner surfaces of the tubes, the outer nozzle inserts will direct hot air on the outer surfaces of the tubes that are directed towards each other. Through a heat activation of the tube material by a direct heating of the surfaces that are to be joined, it is ensured that each tube is correctly sealed and that the tubes are correctly joined. This is particularly advantageous when the tubes consist of a multi layer material, e.g. a material having an aluminium barrier layer. If such a material is only heated from one side, the result may either be that the side that is not heated is too cool or that the side that is heated is too warm.

The number and the size of the outlet openings of the nozzle inserts are adapted to the double tube that is to be sealed. Depending on the material, the number and size of the outlet openings may be varied. The relationship between the outlet openings of the inner and outer nozzle inserts may be varied such that an optimal sealing and joining is obtained. If the two tubes consists of different materials, the relationship between the outlet openings in the first inner nozzle insert and the second inner nozzle insert may be varied, as well as the relationship between the outlet openings in the first outer nozzle insert and the second outer nozzle insert.

When the hot air has heat activated the heat sealable material in the end sections of the tubes, the double tube is lowered from the hot air nozzle. In a consecutive work place, the end sections of the double tube are sealed with clamping jaws. The clamping jaws are preferable cooled, such that a repeatable sealing is obtained.

In a development, the hot gas nozzle 10 further comprises a cooling ring 20. The cooling ring comprises a first opening 21 and a second opening 22, which will have the same shape as the first inner nozzle insert 12 and the second inner nozzle insert 13. The size of the first and the second opening is larger than the inner nozzle inserts, such that an opening can enclose an inner nozzle insert. Each opening comprises a bevelled guiding surface 23, 24. The cooling ring is in this example circular, but other outer shapes are also conceivable. The outer part of the cooling ring is adapted for the connection to a cooling circuit, e.g. a cooling water circuit, such that the cooling ring can be chilled to a predefined temperature.

The cooling ring 20 is adapted for cooperation with the hot gas nozzle 10. This is done by threading the cooling ring over the hot gas nozzle. When the cooling ring is mounted to the hot gas nozzle, the first inner nozzle insert 12 will be provided in the first opening 21 and the second inner nozzle insert 13 will be provided in the second opening 22. The guiding ends 18, 19 will, together with the guiding surfaces 22, 23, form a guiding section such that the end sections of the tubes are guided into the hot gas nozzle in a reliable way. In that way, a slit is created between the inner nozzle inserts and the openings of the cooling ring. The width of the slit is among others determined by the thickness of the tube material and the different parameters of the hot air. It is advantageous that the size of the openings is such that the tubes can be guided into the hot gas nozzle in an easy way.

The purpose of the cooling ring is on the one hand to improve the guiding of the tube ends and on the other hand to chill the section of the tubes that is closest to the end seal section 6. This will ensure that the rest of the tube is not unnecessarily heated. A heating of the tube in areas that shall not be pressed together during the sealing may e.g. weaken the tube material or may alter the outer surface in an aesthetic manner, e.g. by colour changes in the printing on the tube or in the tube material. Between the nozzle body and the cooling ring is an air passage created, that will direct the hot air from the outlet openings 17 to the outflow openings 27. The hot air will thus be partly chilled when it is discarded through the outflow openings.

In a further development of the inventive hot air nozzle, the hot air nozzle comprises separate hot air conduits for each nozzle insert. In this way, the air flow to each nozzle insert can be controlled individually which means that different types of double tubes can be heated with the same hot air nozzle by regulating the air flow to the respective nozzle insert. It is e.g. possible to that the first and the second tube consist of different tube materials which therefore may have different heat activating properties. The air flow to the inner nozzle inserts can thus be controlled individually. In this way, the hot gas nozzle does not have to be replaced when another type of double tube is to be sealed.

In one embodiment, the hot air nozzle comprises a temperature sensor (not shown) that measures and sends a signal to a control unit. By knowing the air quantity, the required heating time can be calculated from the measured temperature. In this way, a correct sealing is ensured even when the temperature varies. It is also possible to measure the air flow if this varies.

The invention is not to be regarded as being limited to the embodiments described above, a number of additional variants and modifications being possible within the scope of the subsequent patent claims.

REFERENCE SIGNS

1: Double tube
2: First tube
3: Second tube
4: Tube shoulder
5: Cap
6: End seal section
10: Hot gas nozzle
11: Nozzle body
12: First inner nozzle insert
13: Second inner nozzle insert
14: First outer nozzle insert
15: Second outer nozzle insert
16: Locking screw
17: Outlet opening
18: Guiding end
19: Guiding end
20: Cooling ring
21: First opening
22: Second opening
23: Guiding surface
24: Guiding surface
25: Projecting edge
26: Flange
27: Outflow opening

What is claimed is:

1. A hot gas nozzle adapted for heating an end section of a double tube, where the double tube comprises a first tube and a second tube, the hot gas nozzle comprising:
 a first inner nozzle insert and a second inner nozzle insert, where the inner nozzle inserts comprises a plurality of outlet openings adapted to heat an internally located section of the first tube and the second tube with hot air,
 wherein the hot gas nozzle further comprises a first outer nozzle insert and a second outer nozzle insert, where the outer nozzle inserts comprise a plurality of outlet openings adapted to heat an external section and between the first tube and the second tube located section of the double tube, which section after a sealing of the double tube will join the first tube and the second tube;
 wherein the hot gas nozzle further comprises a cooling ring adapted to cooperate with the hot gas nozzle; and
 wherein the cooling ring comprises two openings in which the first inner nozzle insert and the second inner nozzle insert fits.

2. The hot gas nozzle according to claim 1, wherein the first inner nozzle insert and the second inner nozzle insert comprises a projecting edge adapted to direct the air flow from the outlet openings.

3. The hot gas nozzle according to claim 1, wherein at least one of the first inner nozzle insert, the second inner nozzle insert, the first outer nozzle insert and the second outer nozzle insert are detachably attached to the hot gas nozzle.

4. The hot gas nozzle according to claim 1, wherein the first inner nozzle insert and the second inner nozzle insert each comprises a guiding end.

5. The hot gas nozzle according to claim 1, wherein the total area of the outlet openings of the first inner nozzle insert differs from the total area of the outlet openings of the second inner nozzle insert.

6. The hot gas nozzle according to claim 1, wherein at least one of the first inner nozzle insert, the second inner nozzle insert, the first outer nozzle insert and the second outer nozzle insert is supplied with hot air from a separate hot air conduit.

7. The hot gas nozzle according claim 1, wherein the openings are provided with guiding surfaces.

8. A tube filling machine comprising:
 a hot gas nozzle, the hot gas nozzle adapted for heating an end section of a double tube,
 wherein the double tube comprises a first tube and a second tube,
 the hot gas nozzle including a first inner nozzle insert and a second inner nozzle insert, the inner nozzle inserts comprising a plurality of outlet openings adapted to heat an internally located section of the first tube and the second tube with hot air,
 the hot gas nozzle further comprising a first outer nozzle insert and a second outer nozzle insert, where the outer nozzle inserts comprise a plurality of outlet openings adapted to heat an externally located section and a between the first tube and the second tube located section of the double tube, which section after a sealing of the double tube will join the first tube and the second tube;
 wherein the hot gas nozzle further comprises a cooling ring adapted to cooperate with the hot gas nozzle; and
 wherein the cooling ring comprises two openings in which the first inner nozzle insert and the second inner nozzle insert fit.

9. The tube filling machine of claim 8, wherein the first inner nozzle insert and the second inner nozzle insert comprises a projecting edge adapted to direct the air flow from the outlet openings.

10. The tube filling machine of claim 8, wherein at least one of the first inner nozzle insert, the second inner nozzle insert, the first outer nozzle insert and the second outer nozzle insert are detachably attached to the hot gas nozzle.

11. The tube filling machine of claim 8, wherein the first inner nozzle insert and the second inner nozzle insert each comprises a guiding end.

12. The tube filling machine of claim 8, wherein the total area of the outlet openings of the first inner nozzle insert differs from the total area of the outlet openings of the second inner nozzle insert.

13. The tube filling machine of claim 8, wherein at least one of the first inner nozzle insert, the second inner nozzle insert, the first outer nozzle insert and the second outer nozzle insert is supplied with hot air from a separate hot air conduit.

14. The tube filling machine of claim 8, the two openings are provided with guiding surfaces.

* * * * *

UNITED STATES PATENT AND TRADEMARK OFFICE
CERTIFICATE OF CORRECTION

PATENT NO. : 8,430,145 B2  Page 1 of 1
APPLICATION NO. : 12/867813
DATED : April 30, 2013
INVENTOR(S) : Jan Nilsson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 228 days.

Signed and Sealed this
Eighth Day of September, 2015

Michelle K. Lee
*Director of the United States Patent and Trademark Office*